(12) United States Patent
Watanabe et al.

(10) Patent No.: US 8,189,531 B2
(45) Date of Patent: May 29, 2012

(54) WIRELESS COMMUNICATION SYSTEM, WIRELESS BASE STATION, AND WIRELESS COMMUNICATION CONTROL METHOD

(75) Inventors: Teruyoshi Watanabe, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 879 days.

(21) Appl. No.: 11/790,381

(22) Filed: Apr. 25, 2007

(65) Prior Publication Data

US 2008/0084846 A1    Apr. 10, 2008

(30) Foreign Application Priority Data

Oct. 6, 2006 (JP) .................................. 2006-275258

(51) Int. Cl.
*H04W 4/00* (2009.01)
(52) U.S. Cl. ........ 370/331; 370/392; 370/471; 445/436; 445/437; 445/438; 445/439; 445/440; 445/441; 445/442; 445/443; 445/444
(58) Field of Classification Search .................. 370/331, 370/392, 471; 455/438
See application file for complete search history.

(56) References Cited

U.S. PATENT DOCUMENTS

| | | | | |
|---|---|---|---|---|
| 5,699,367 | A * | 12/1997 | Haartsen ........................ | 714/749 |
| 6,920,504 | B2 * | 7/2005 | Bender et al. ................. | 709/232 |
| 6,999,434 | B1 * | 2/2006 | Agrawal et al. ............... | 370/331 |
| 2002/0141360 | A1 * | 10/2002 | Baba et al. .................... | 370/331 |
| 2004/0022213 | A1 | 2/2004 | Choi et al. | |
| 2005/0141455 | A1 | 6/2005 | Kim et al. | |
| 2005/0141477 | A1 * | 6/2005 | Tomita et al. ................. | 370/349 |
| 2005/0169249 | A1 * | 8/2005 | Shirota et al. ................. | 370/352 |

FOREIGN PATENT DOCUMENTS

| | | |
|---|---|---|
| EP | 1 545 143 A1 | 6/2005 |
| JP | 2003-523137 | 7/2003 |
| JP | 2003-523138 | 7/2003 |
| JP | 2003-530764 | 10/2003 |
| JP | 2004-517580 | 6/2004 |

(Continued)

OTHER PUBLICATIONS

"Feasibility Study for Evolved Universal Terrestrial Radio Access (UTRA) and Universal Terrestrial Radio Access Network (UTRAN) 9.4.2.2 Solution for Intra-LTE-Access Mobility Support for UEs in LTE_ACTIVE," *3GPP TR*, 25-912, Version 7.0.0, Jun. 2006.

*Primary Examiner* — Huy Phan
*Assistant Examiner* — Edward Zhang
(74) *Attorney, Agent, or Firm* — Murphy & King, P.C.

(57) ABSTRACT

A wireless communication system is disclosed that includes plural wireless base stations that act as an origin wireless base station and a destination wireless base station, and a wireless mobile station. The origin wireless base station starts a handover process in response to movement of the wireless mobile station, attaches a header including transfer order information to transmission packet data addressed to the wireless mobile station, and transfers the transmission packet data with the header to the destination wireless base station. The destination wireless base station receives the transmission packet data with the header, determines whether a transfer order of the transmission packet data is correct based on the transfer order information included in the header, deletes the header from the transmission packet data upon determining that the transfer order is correct, and transmits the transmission packet data without the header to the wireless mobile station upon completion of the handover process.

7 Claims, 6 Drawing Sheets

FOREIGN PATENT DOCUMENTS

| | | |
|---|---|---|
| JP | 2006-203265 | 8/2006 |
| KR | 2003/0092894 | 12/2003 |
| KR | 10-2005/0067339 | 7/2005 |
| WO | WO 00/33503 | 6/2000 |
| WO | WO 01/24567 | 4/2001 |
| WO | WO 01/60016 A1 | 8/2001 |
| WO | WO 01/60017 A1 | 8/2001 |
| WO | WO01/78286 A2 | 10/2001 |
| WO | WO02/056561 A1 | 7/2002 |
| WO | WO 2004/006515 | 1/2004 |

* cited by examiner

WIRELESS COMMUNICATION SYSTEM, WIRELESS BASE STATION, AND WIRELESS COMMUNICATION CONTROL METHOD

BACKGROUND OF THE INVENTION

1. Field of the Invention

The present invention relates to a wireless communication system including plural wireless base stations and a mobile station, a wireless base station that exchanges packet data with another wireless base station, and a wireless communication control method for controlling communication between the wireless base stations and the wireless mobile station.

2. Description of the Related Art

Various types of wireless communication systems have been proposed that include plural wireless base stations each administering service areas that are allocated in a manner such that the service areas partially overlap with one another. In such communication systems, the wireless base stations may be interconnected via a superordinate station and a network so that a wireless mobile station, either in motion or still, that is located within a given service area may establish communication with another wireless mobile station, a terminal apparatus such as a fixed telephone terminal, or a host apparatus that handles large amounts of data. For example, the next generation wireless communication system that is represented by the LTE (Long Term Evolution) enables high speed transmission by arranging data into packets. It is noted that when a mobile station is in communication with a counterpart apparatus while it is in motion, a handover process may have to be performed in order to switch the wireless base station with which the mobile station is currently in communication to a wireless base station located within a destination area toward which the wireless mobile station is moving. Such a handover process may be started when it is detected that the reception quality such as the reception level and reception error rate of the currently established communication has decreased to be less than or equal to a predetermined value. By switching the base station with which communication is established from a current base station to a base station located within a destination area that can provide desired reception quality, the wireless mobile station may continue its communication with the counterpart apparatus via communication with the wireless base station of the destination area.

It is noted that in a wireless communication system for transmitting packet data, generally, packet numbers are assigned to packet data sets of a sequence in order to enable confirmation of packet continuity. For example, Japanese-Translated International Patent Publication No. 2003-523137 (corresponding to PCT Publication WO 01/060016) discloses a technique for enabling packet transmission between GPRS (General Packet Radio Service) and UMTS (Universal Mobile Telecommunication System) and confirmation of packet continuity by embedding sequence numbers in data.

Also, it is noted that in a wireless communication system, plural wireless base stations may be connected via one or more access gateways and a network. For example, 3GPP TR25.912 version 7.0.0 discloses a system in which wireless base stations under an access gateway are interconnected by a logical path, and when a handover process needs to be performed due to movement of a wireless mobile station, data from the access gateway are transferred in RLC-SDU (Radio Link Control-Service Data Unit) via the logical path from a base station that is currently in communication with the wireless mobile station to a destination wireless base station located in the destination area toward which the wireless mobile station is moving. The destination wireless base station temporarily stores the transferred data, and sequentially transmits the stored data to the wireless mobile station when the handover process is completed.

It is noted that the continuity of packet data exchanged between a superordinate apparatus such as an access gateway to a subordinate apparatus such as a wireless mobile station may be determined by monitoring data sequence numbers assigned to PDCP (Packet Data Convergence Protocol) layers and searching for omissions or disruptions in the sequence order of the packet data, for example. Also, packet data continuity may be ensured by implementing retransmission processes in TCP (Transmission Control Protocol) layers, for example.

However, according to the system disclosed in 3GPP TR 25.912 version 7.0.0, packet data continuity may not be completely ensured. Specifically, as can be appreciated from the above descriptions, according to this system, when a wireless mobile station is handed over from an origin wireless base station to a destination wireless base station, packet data are transmitted from the origin wireless base station to the destination wireless base station via a logical path and stored in the destination wireless base station until the handover process is completed. Then, after the handover process is completed, the stored packet data are sequentially transmitted to the wireless mobile station. In this case, although temporary, the continuity of the packet data transmitted from an origin wireless base station to a destination wireless base station may not be ensured. In this system, although continuity of packet data exchanged between a superordinate apparatus and a wireless mobile station may be ensured, packet data transmitted between wireless base stations in RLC-SDU may not be ensured. Therefore, the destination wireless base station may not be able to determine whether packet data transmitted thereto via the logical path correspond to a header packet or whether one or more packets of a packet data sequence have been lost.

SUMMARY OF THE INVENTION

According to an aspect of the present invention, a technique is provided for ensuring continuity of packet data during a handover process.

According to one embodiment of the present invention, a wireless communication system is provided that includes plural wireless base stations that are configured to act as an origin wireless base station and a destination wireless base station; and a wireless mobile station that is configured to exchange packet data with the wireless base stations; wherein the origin wireless base station starts a handover process in response to movement of the wireless mobile station, attaches a header including transfer order information to transmission packet data addressed to the wireless mobile station, and transfers the transmission packet data with the header to the destination wireless base station; and the destination wireless base station receives the transmission packet data with the header, determines whether a transfer order of the transmission packet data is correct based on the transfer order information included in the header, and deletes the header from the transmission packet data and transmits the transmission packet data without the header to the wireless mobile station when the handover process is completed.

In one preferred embodiment, the origin wireless base station transfers the transmission packet data with the header to the destination wireless base station via a logical path established between the origin wireless base station and the destination wireless base station; and the destination wireless base station stores the transmission packet data with the header transferred via the logical path until the handover process is completed, and deletes the header from the transmission packet data and transmits the transmission packet data without the header to the wireless mobile station when the handover process is completed.

In another preferred embodiment, the destination wireless base station determines whether the transfer order of the transmission packet data from the origin wireless base station is correct based on the transfer order information and transmits a request for retransmission to the origin wireless base station upon determining that the transfer order is not correct.

According to another embodiment of the present invention, a wireless base station that exchanges packet data with a wireless mobile station and controls a handover process of the wireless mobile station is provided, the wireless base station including:

an origin wireless base station module that operates as a handover origin of the wireless mobile station, starts the handover process upon detecting movement of the wireless mobile station, attaches a header including transfer order information to transfer packet data to be transferred to a destination wireless base station of the wireless mobile station, and transfers the transfer packet data with the header to the destination wireless base station via a logical path; and a destination wireless base station module that operates as a handover destination of the wireless mobile station, receives transmission packet data addressed to the wireless mobile station from an origin wireless base station of the wireless mobile station when the handover process is started, determines whether a transfer order of the transmission packet data is correct based on transfer order information included in a header attached to the transmission packet data, stores the transmission packet data until the handover process is completed, and deletes the header attached to the transmission packet data and transmits the transmission packet data without the header to the wireless mobile station when the handover process is completed.

In one preferred embodiment, the destination wireless base station module is configured to send a request for retransmission to the origin wireless base station via a logical path upon determining that the transfer order of the transmission packet data is not correct.

According to another embodiment, a wireless communication control method is provided for controlling transmission/reception of packet data between a wireless base station and a wireless mobile station, the method comprising the steps of:

attaching a header including transfer order information to transmission packet data addressed to the wireless mobile station and transferring the transmission packet data with the header from an origin wireless base station to a destination wireless base station when a handover process of the wireless mobile station is started in response to movement of the wireless mobile station;

determining at the destination wireless mobile station whether a transmission order of the transmission packet data is correct based on the transmission order information of the header; and deleting the header from the transmission packet data and transmitting the transmission packet data without the header from the destination wireless base station to the wireless mobile station when the hand over process is completed.

In one preferred embodiment, the wireless communication control method further includes the steps of:

transferring the transmission packet data with the header from the origin wireless base station to the destination wireless base station via a logical path; and sending a request for retransmission from the destination wireless base station to the origin wireless base station when the destination wireless base station determines based on the transfer order information that the transfer order of the transmission packet data is not correct.

According to one aspect of the present invention, by attaching a header including transfer order information to transmission packet data addressed to a wireless mobile station and transferring the transmission packet data with the header from an origin wireless base station to a destination wireless base station when a handover process for the wireless mobile station is started in response to movement of the wireless mobile station, continuity of the transmission packet data may be ensured even during the time the transmission packet data are temporarily transferred from the origin wireless base station to the destination wireless base station. According to another aspect of the present invention, the header attached to the transmission packet data when the transmission packet data are transferred from the origin wireless base station to the destination wireless base station has a simple configuration that merely indicates the transfer order of the transmission packet data so that the influence of such a header on the transfer bandwidth and the transfer process may be negligible.

DESCRIPTION OF THE PREFERRED EMBODIMENTS

In the following, preferred embodiments of the present invention are described with reference to the accompanying drawings.

Figure 1:
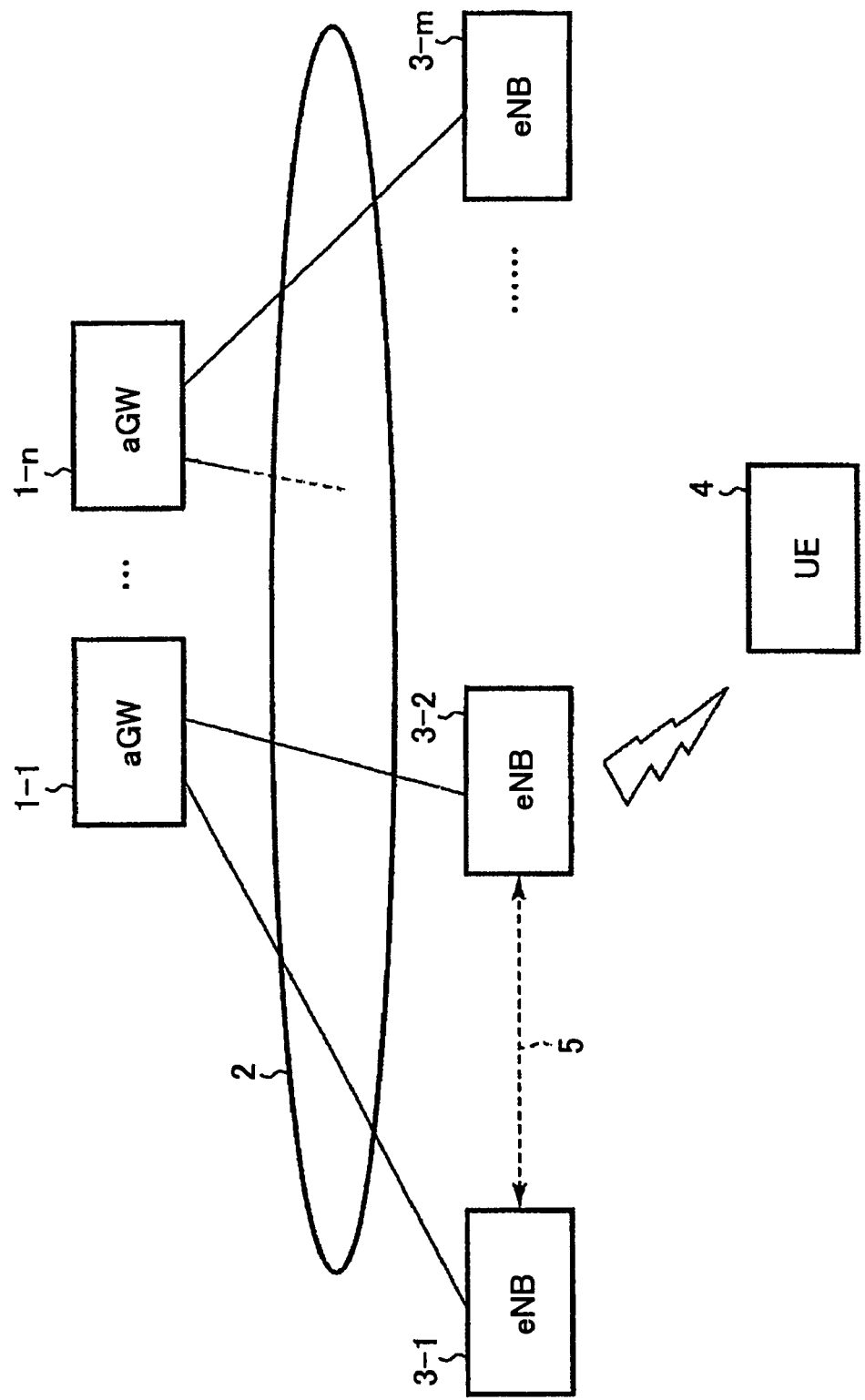
FIG. 1 is a diagram showing an overall configuration of a wireless communication system according to an embodiment of the present invention.

FIG. 1 is a diagram showing an overall configuration of a wireless communication system according to an embodiment of the present invention. The illustrated wireless communication system includes access gateways (aGW: access Gate Way) 1-1 through 1-*n*, a network 2, wireless base stations (eNB: enhanced Node B) 3-1 through 3-*m*, a wireless mobile station (UE: User Equipment) 4, and logical paths 5. According to the present embodiment, the wireless base stations 3-1 through 3-*m* are connected to the access gateways 1-1 through 1-*n* via the network 2. The wireless base stations 3-1 through 3-*m* are interconnected by physical paths that are established by the access gateways 1-1 through 1-*n*. Also, as is shown in FIG. 1, the wireless base stations 3-1 through 3-*m* are interconnected by logical paths 5, and packet data and control information may be transmitted via such logical paths 5.

It is noted that sequence numbers are assigned to packet data that are exchanged between the access gateways 1-1 through 1-$n$ and the wireless mobile station 4 via the wireless base stations 3-1 through 3-$m$. For example, packet data to be transmitted from the access gateway 1-1 to the wireless mobile station 4 via the wireless base station 3-1 may include address information of the wireless mobile station 4 and sequence number information. In this way, the wireless mobile station 4 may check the transfer order of the packet data. In the case of performing a handover process for switching from the wireless base station 3-1 as the origin wireless base station to the wireless base station 3-2 as the destination wireless base station in response to movement of the wireless mobile station 4, the wireless base station 3-1 transfers packet data received from the access gateway 1-1 during the handover process to the wireless base station 3-2 via the logical path 5. The wireless base station 3-2 as the destination wireless base station stores the packet data until the handover process is completed and transmits the stored packet data to the wireless mobile station 4 when the handover process is completed. From this point and onward, the wireless base station 3-2 receives packet data addressed to the wireless mobile station 4 from the access gateway 1-1 and transmits the packet data to the wireless mobile station 4.

In the handover process as is described above, the packet data transferred from the origin wireless base station 3-1 to the destination wireless base station 3-2 via the logical path 5 generally correspond to midstream data of transmission packet data being transmitted from the access gateway 1-1 to the wireless mobile station 4. Accordingly, in one embodiment, a header including transfer order information may be attached to the packet data that are transferred via the logical path 5. Specifically, the wireless base stations 3-1 through 3-$m$, when acting as an origin wireless base station, have means for attaching a header including transfer order information to packet data addressed to the wireless mobile station 4 and transmitting the packet data to a destination wireless base station for the wireless mobile station 4 via the logical path 5 when a handover process is started; and the wireless base stations 3-1 through 3-$m$, when acting as a destination wireless base station, have means for determining whether the transfer order of the packet data transferred thereto from an origin wireless base station is correct based on the transfer order information included in the header attached to the transferred packet data, and deleting the header from the packet data and transmitting the packet data without the header to the wireless mobile station 4 when the handover process is completed.

In this embodiment, the header including the transfer order information of the packet data may have a relatively simple configuration for merely enabling determination of whether the transfer order of the packet data being transferred from the origin wireless base station to the destination wireless base station via the logical path is correct, and thereby, the influence of such a header on the transmission bandwidth of the logical path may be negligible. Also, the destination wireless base station may easily determine whether the transfer order of transmission packet data is correct based on the transfer order information included in the header, and when the transfer order is not correct, the destination wireless base station may send a request for retransmission of the packet data to the origin wireless base station. In this way, the initial sequence order of packet data at the start of the handover process may be maintained until the handover process is completed so that the packet data may be transmitted to the wireless mobile station 4 in the proper sequence order.

Figure 2:
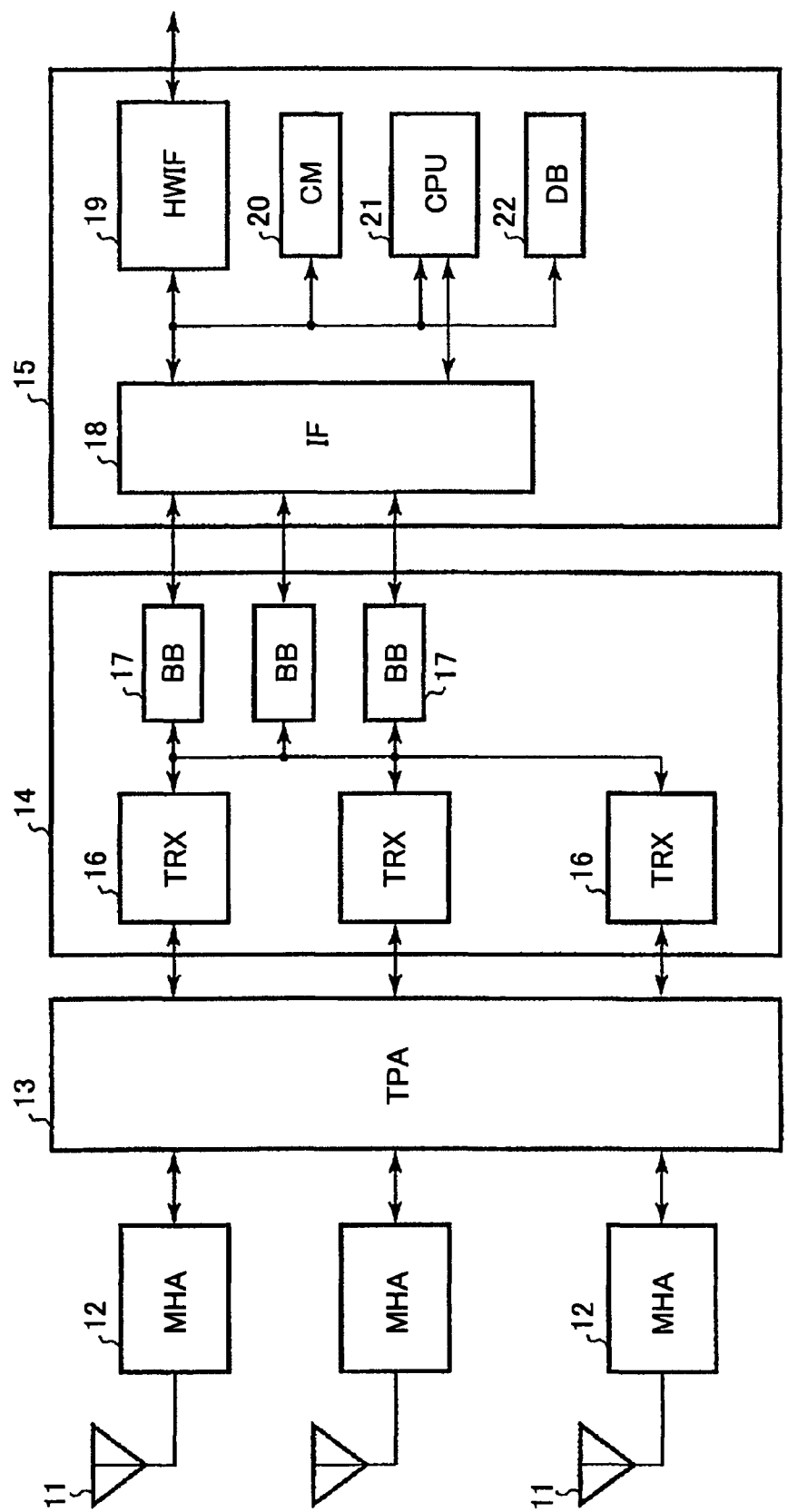
FIG. 2 is a block diagram showing relevant parts of a wireless base station according to an embodiment of the present invention.

FIG. 2 is a diagram illustrating relevant parts of a wireless base station according to an embodiment of the present invention. Specifically, FIG. 2 illustrates transmission and reception functions of the wireless base station. As is shown in this drawing, the wireless base station according to the present embodiment includes antennas 11, masthead amplifiers (MHA) 12, a transmit power amplifier (TPA) 13, a transmission/reception control unit 14, and a control process unit 15. The transmission/reception control unit 14 includes transmitter/receiver units (TRX) 16 and base band units (BB) 17. The control process unit 15 includes an interface (IF) 18, a high way interface (HWIF) 19, a common memory (CM) 20, a call processing unit (CPU) 21, and a database unit (DB) 22.

The antennas 11 enable packet data transmission/reception between the present wireless base station and a wireless mobile station such as the wireless mobile station 4 shown in FIG. 1. It is noted that various existing wireless transmission/reception applications may be used to configure the antennas 11, the mast head amplifiers 12, the transmit power amplifier 13 and the transmitter/receiver units 16. The high way interface 19 enables packet data transmission/reception between the present wireless base station and its superordinate access gateway and packet data transmission/reception between the present wireless base station and another wireless base station via the logical path 5. The call processing unit 21 controls overall operations of the present wireless base station. For example, the call processing unit 21 may exchange control information with the base band units 17 of the transmission/reception control unit 14 via the interface 18. In one embodiment, a signal line for transferring control information between the call processing unit 21 and the base band units 17 may be established. According to the present embodiment, packet data to be transmitted from an access gateway to a wireless mobile station may be received at the high way interface 19 and transferred to the interface 18, the base band unit 17, the transmitter/receiver unit 16, the transmit power amplifier 13, the mast head amplifier 12, and the antenna 11, to be transmitted to the wireless mobile station. Packet data to be transmitted from a wireless mobile station to an access gateway may follow a reverse path of the transmission path described above.

When a handover process is started, the wireless base station of FIG. 2 as an origin wireless base station refrains from transmitting packet data received from the access gateway to the wireless mobile station, and instead, the call processing unit 21 controls the base band unit 17 to attach a header to the packet data and transfer the packet data with the header to a destination wireless base station via a logical path established between the present wireless base station and the destination wireless base station. The wireless base station of FIG. 2 as a destination wireless base station receives packet data at the highway interface 19 via a logical path established with an origin wireless base station, transfer the received packet data to the base band unit 17 via the interface 18, and determines whether the transfer order of the packet data is correct based on the header attached to the packet data. In one embodiment, the determination process for determining whether the transfer order of the packet data is correct based on the header may be performed by the call processing unit 21, and when it is determined that the transfer order of the packet data is correct, the header may be deleted from the packet data and the packet data may be stored in the common memory 20, for example, until the handover process is completed. In a case where it is determined that the transfer order of the packet data is not correct due to loss of some of the packet data, for example, a request for retransmission of the packet data may be sent to the origin wireless base station through control operations of the call processing unit 21. When the handover process is completed, the call processing unit 21 may sequentially read the packet data stored in the common memory 20 and transfer the read packet data to the base band unit 17 to start transmission of the packet data to the wireless mobile station.

According to one embodiment, the call processing unit 21, the base band unit 17, and the transmitter/receiver unit 16 may embody means for attaching a header including transfer order information to packet data and transferring the packet data to a destination wireless base station when a handover process is started and means for deleting a header attached to packet data and transmitting the packet data without the header to a wireless mobile station. Also, the call processing unit 21 may embody means for determining reception of the transfer order information and determining whether the transfer order of packet data is correct and means for requesting retransmission of packet data, for example.

Figure 3:
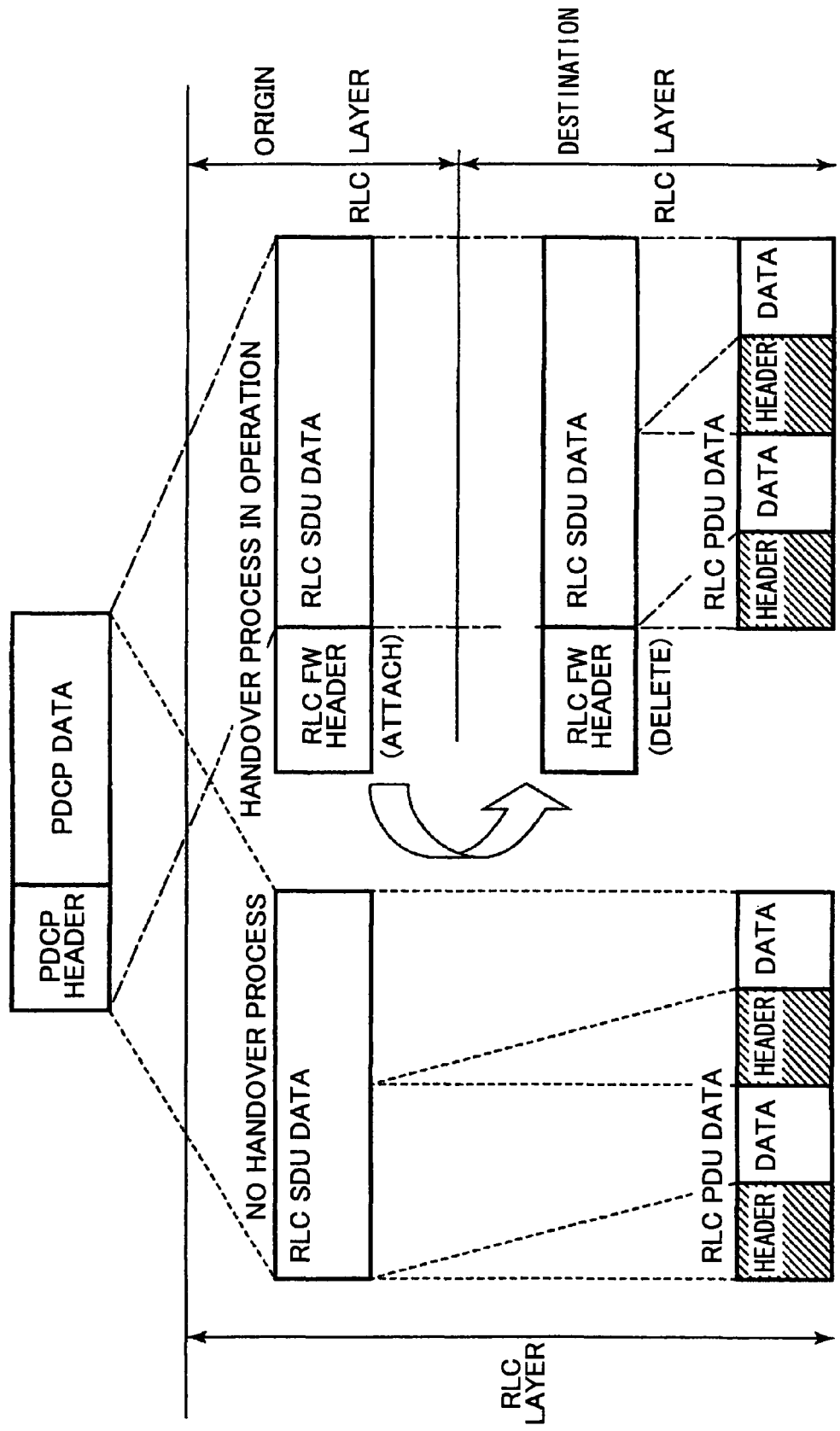
FIG. 3 is a diagram illustrating packet data transmission according to an embodiment of the present invention.

FIG. 3 is a diagram illustrating packet data transfer according to an embodiment of the present invention. Specifically, FIG. 3 illustrates transfer of packet data including PDCP (Packet Data Convergence Protocol) data with a PDCP header containing address information of a transmission destination and a transmission origin when a handover process is not performed (see left side of FIG. 3) and when a handover process is performed (see right side of FIG. 3). As is shown in this drawing, when a handover process is not performed, RLC SDU (Radio Link Control Service Data Unit) data are transmitted to the wireless mobile station in the RLC layer as RLC PDU (Radio Link Control Packet Data Unit) data that are made up of subdivided data units with headers attached thereto, the header including address information of the transmission destination and the transmission origin.

It is noted that the RLC layer of the destination wireless base station and the RLC layer of the origin wireless base station are shown in the case where a handover process is performed. In this case, the origin wireless base station attaches a RLC FW (Radio Link Control Forwarding) header to the RLC SDU data and transfers the packet data with the header to the destination wireless base station via a logical path in the manner described above. The RLC FW header is attached to packet data that are transferred to the destination wireless base station during the handover process and contains transfer order information for enabling recognition of the transfer order of the packet data being transferred via the logical path. The destination wireless base station may recognize the transfer order of the packet data transferred thereto via the logical path based on the RLC FW header and may delete this RLC FW header when the handover process is completed to then transmit RLC PDU data without the RLC FW header to the wireless mobile station in a manner similar to the case in which a handover process is not performed.

Figure 4:
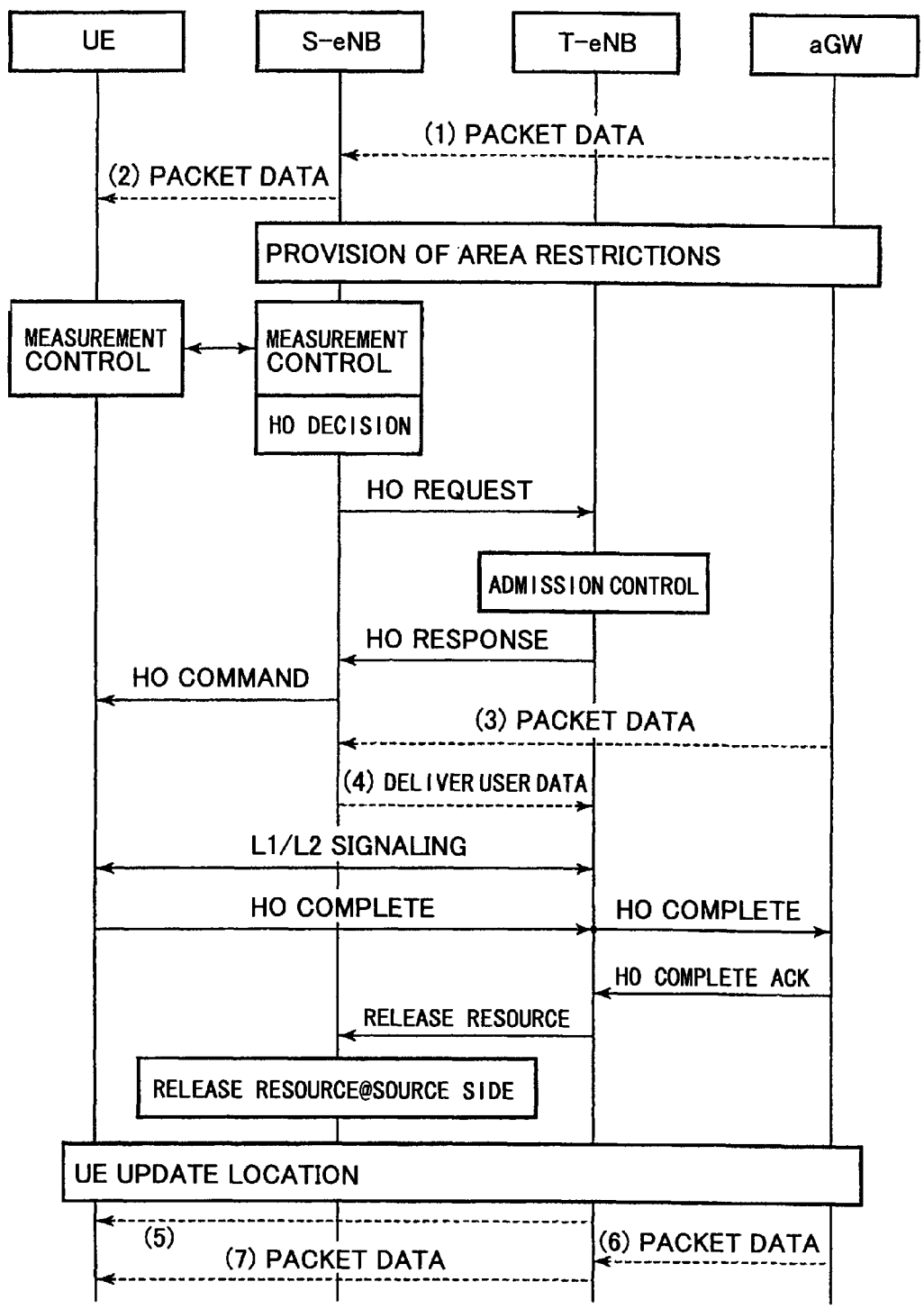
FIG. 4 is a sequence chart illustrating packet data transmission according to an embodiment of the present invention.

FIG. 4 is a sequence chart illustrating packet data transmission according to an embodiment of the present invention. It is noted that FIG. 4 shows a wireless mobile station UE (user equipment), an origin wireless base station S-eNB (Source eNB), a destination wireless base station T-eNB (Target eNB), and an access gateway aGW. As is shown in this drawing, packet data may be transmitted from the access gateway aGW to the origin wireless base station S-eNB (1), and in turn, the origin wireless base station S-eNB may transmit the packet data to the wireless mobile station UE (2). The packet data transmission in this case may correspond to the packet data transmission in the RLC layer where a handover process is not performed as is illustrated in FIG. 3, for example.

Also, as is shown in FIG. 4, the access gateway aGW may inform the origin wireless base station S-eNB of handover process conditions ("Provision of Area Restrictions"), and in turn, the origin wireless base station S-eNB may decide to start a handover process ("HO Decision") based on measurements of the communication quality of communication between the wireless mobile station UE and the origin wireless base station S-eNB ("Measurement Control") and send a handover process request to the destination wireless base station T-eNB ("HO Request"). In response to the handover process request, the destination wireless base station T-eNB may determine whether adequate resources may be secured for performing the handover process ("Admission Control"), and upon determining that the handover process request may be accepted, the destination wireless base station T-eNB may send a handover process response ("HO Response") to the origin wireless base station S-eNB. In turn, the origin wireless base station S-eNB may transmit a handover process start command ("HO Command") to the wireless mobile station UE so that a handover process may be started.

When the access gateway aGW transmits packet data for the wireless mobile station UE to the origin wireless base station S-eNB after the handover process start command is issued (3), the origin wireless base station S-eNB may transfer the packet data with the RLC FW header containing transfer order information as is shown in FIG. 3 as "Deliver User Data" to the destination wireless base station T-eNB via the logical path 5 as is shown in FIG. 1 (4). The wireless mobile station UE may exchange signals with the destination wireless base station T-eNB to be in synch with the destination wireless base station T-eNB ("L1/L2 signaling"), and when synchronization is achieved, the wireless mobile station UE may inform the destination wireless base station T-eNB of the completion of the handover process ("HO Complete"). In turn, the destination wireless base station T-eNB may inform the access gateway aGW of the completion of the handover process ("HO Complete"). When the destination wireless base station T-eNB receives acknowledgement (HO Complete ACK) from the access gateway aGW, it sends a signal to the origin wireless base station S-eNB to release resources ("Release Resource"). In another embodiment, such a signal may be transmitted to the origin wireless base station S-eNB when the destination wireless base station T-eNB receives the signal indicating completion of the handover process.

In response to receiving the "Release Resource" signal from the destination wireless base station T-eNB, the origin wireless base station S-eNB may release resources for establishing wireless communication with the wireless mobile station UE. The access gateway aGW may update the position of the wireless mobile station UE, and the destination wireless base station T-eNB may transmit the packet data transferred from the origin wireless base station S-eNB to the wireless mobile station UE via the logical path 5 (5). Thereafter, the access gateway aGW may transmit packet data for the wireless mobile station UE to the destination wireless base station T-eNB (6), and the destination wireless base station T-eNB may transmit the received packet data to the wireless mobile station UE (7).

Figure 5A:
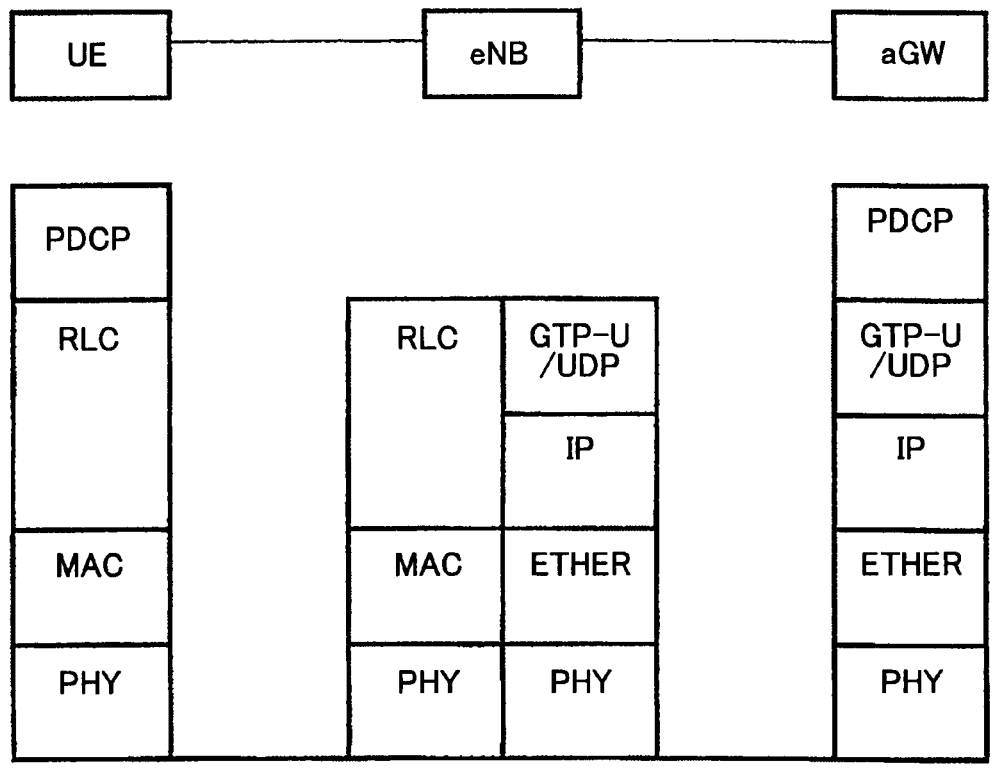
FIGS. 5A and 5B are diagrams illustrating protocol stacks implemented in an embodiment of the present invention.
Figure 5B:
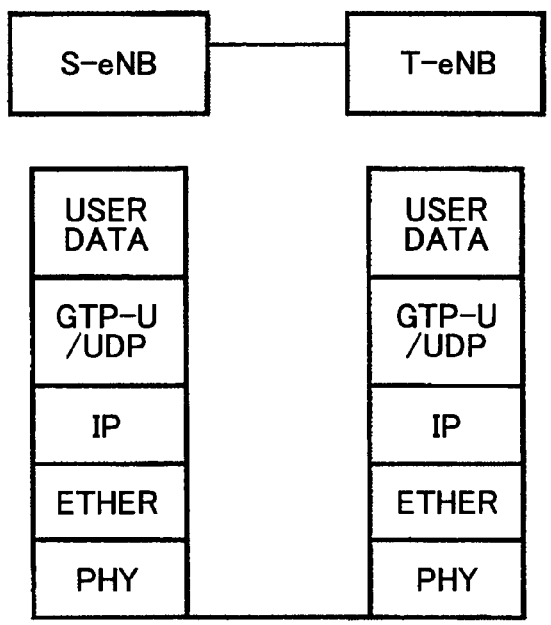

FIGS. 5A and 5B are diagrams illustrating protocol stacks. Specifically, FIG. 5A shows a protocol stack (framing protocol) for a user plane between the wireless mobile station UE, the wireless base station eNB, and the access gateway aGW, and FIG. 5B shows a protocol stack (framing protocol) for a user plane between the origin wireless base station S-eNB and the destination wireless base station T-eNB. As is shown in FIG. 5A, a PDCP (Packet Data Convergence Protocol) layer is provided between the wireless mobile station UE and the access gateway aGW; a RLC (Radio Link Control) layer, a MAC (Medium Access Control) layer, and a PHY (physical) layer are provided between the wireless mobile station UE and the wireless base station eNB; and a GTP-U/UDP layer, an IP layer, an Ether (registered trademark) layer, and a PHY (physical) layer are provided between the wireless base station eNB and the access gateway aGW. FIG. 5B illustrates a case in which a logical path is established between the origin wireless base station S-eNB and the destination wireless base station T-eNB. In this case, a user data layer, a GTP-U/UDP layer, an IP layer, an Ether (registered trademark) layer, and a PHY layer are provided.

Figure 6:
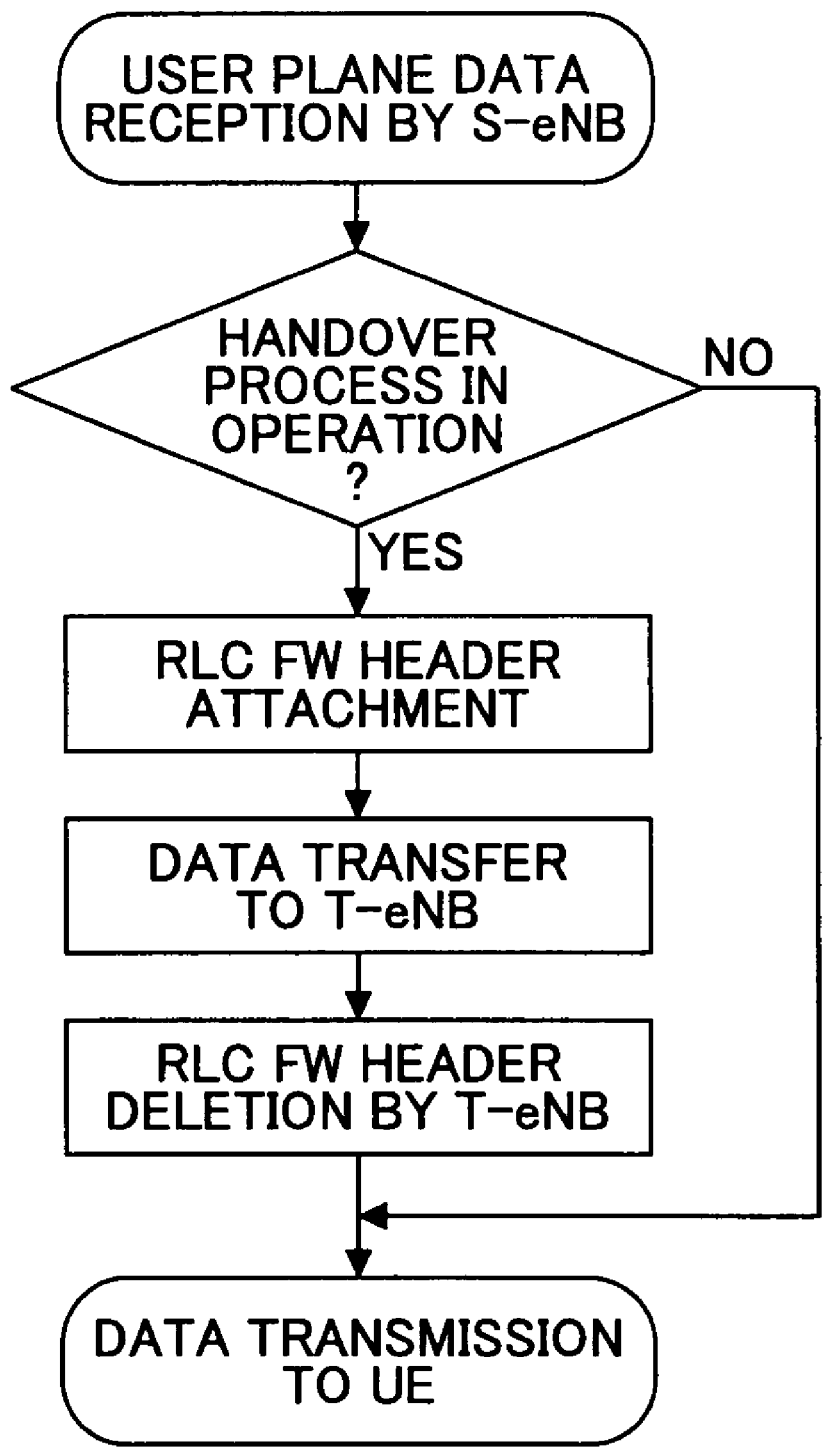
FIG. 6 is a flowchart showing process steps that are relevant to an embodiment of the present invention.

FIG. 6 is a flowchart illustrating relevant process steps of a wireless communication control method according to an embodiment of the present invention. As is shown in this drawing, when the origin wireless base station S-eNB receives User Plane data, it determines whether a handover process (HO) is currently being performed. If a handover process is not performed, the origin wireless base station S-eNB transfers the received packet data to the wireless mobile station UE. If a handover process is performed, the origin wireless base station S-eNB attaches a RLC FW header to the received packet data as is shown in FIG. 3 and transfers the packet data to the destination wireless base station T-eNB. In this case, the packet data with the RLC FW header containing transfer order information such as sequence number information may be transferred via a logical path established between the origin wireless base station S-eNB and the destination wireless base station T-eNB. In turn, the destination wireless base station T-eNB determines whether the transfer order of the packet data is correct, and stores the packet data until the handover process is completed. When the handover process is completed, the destination wireless base station T-eNB transmits the packet data without the RLC FW header to the wireless mobile station UE. It is noted that although a step of determining whether the transfer order of packet data is correct and a step of requesting retransmission of the packet data upon determining that the transfer order of the packet data is not correct is not shown in FIG. 6, such steps may be performed before completion of the handover process according to preferred embodiments of the present invention.

Further, although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-275258 filed on Oct. 6, 2006, the entire contents of which are hereby incorporated by reference.

What is claimed is:

1. A wireless communication system comprising:
a plurality of wireless base stations which wireless base stations are configured to act as an origin wireless base station and a destination wireless base station; and
a wireless mobile station configured to exchange packet data with the wireless base stations; wherein
the origin wireless base station is configured to start a handover process in response to movement of the wireless mobile station, attach a header including transfer order information to transmission packet data addressed to the wireless mobile station, and transfer the transmission packet data with the header to the destination wireless base station, wherein the transfer order information provides the capability to determine whether the transfer order of the packet data being transferred from the origin wireless base station to the destination wireless base station is correct; and
the destination wireless base station is configured to receive the transmission packet data with the header, determine whether a transfer order of the transmission packet data is correct based on the transfer order information included in the header, and delete the header from the transmission packet data and start transmitting the transmission packet data without the header to the wireless mobile station after the origin wireless base station releases resources for establishing wireless communication with the wireless mobile station after the handover process is completed.

2. The wireless communication system as claimed in claim 1, wherein
the origin wireless base station is configured to transfer the transmission packet data with the header to the destination wireless base station via a logical path established between the origin wireless base station and the destination wireless base station; and
the destination wireless base station is configured to store the transmission packet data with the header transferred via the logical path until the handover process is completed, and deletes the header from the transmission packet data and transmits the transmission packet data without the header to the wireless mobile station when the handover process is completed.

3. The wireless communication system as claimed in claim 1, wherein
the destination wireless base station is configured to determine whether the transfer order of the transmission packet data from the origin wireless base station is correct based on the transfer order information and transmit a request for retransmission to the origin wireless base station upon determining that the transfer order is not correct.

4. A wireless base station configured to exchange packet data with a wireless mobile station and control a handover process of the wireless mobile station, the wireless base station comprising:
an origin wireless base station module configured to operate as a handover origin of the wireless mobile station, start the handover process upon detecting movement of the wireless mobile station, attach a header including transfer order information to transfer packet data to be transferred to a destination wireless base station of the wireless mobile station, and transfer the transfer packet data with the header to the destination wireless base station via a logical path, wherein the transfer order information provides the capability to determine whether the transfer order of the packet data being transferred from the origin wireless base station to the destination wireless base station via the logical path is correct; and
a destination wireless base station module configured to operate as a handover destination of the wireless mobile station, receive transmission packet data addressed to the wireless mobile station from an origin wireless base station of the wireless mobile station when the handover process is started, determine whether a transfer order of the transmission packet data is correct based on transfer order information included in a header attached to the transmission packet data, store the transmission packet data until the handover process is completed, and delete the header attached to the transmission packet data and start transmitting the transmission packet data without the header to the wireless mobile station after the origin wireless base station releases resources for establishing wireless communication with the wireless mobile station after the handover process is completed.

5. The wireless base station as claimed in claim 4, wherein the destination wireless base station module is configured to send a request for retransmission to the origin wireless base station via a logical path upon determining that the transfer order of the transmission packet data is not correct.

6. A wireless communication control method for controlling transmission/reception of packet data between a wireless base station and a wireless mobile station, the method comprising:

attaching a header including transfer order information to transmission packet data addressed to the wireless mobile station and transferring the transmission packet data with the header from an origin wireless base station to a destination wireless base station when a handover process of the wireless mobile station is started in response to movement of the wireless mobile station, wherein the transfer order information provides the capability to determine whether the transfer order of the packet data being transferred from the origin wireless base station to the destination wireless base station is correct;

determining at the destination wireless base station whether a transmission order of the transmission packet data is correct based on the transmission order information of the header; and deleting the header from the transmission packet data and starting transmitting the transmission packet data without the header from the destination wireless base station to the wireless mobile station after the origin wireless base station releases resources for establishing wireless communication with the wireless mobile station after the hand over process is completed.

7. The wireless communication control method as claimed in claim 6, further comprising:

transferring the transmission packet data with the header from the origin wireless base station to the destination wireless base station via a logical path; and sending a request for retransmission from the destination wireless base station to the origin wireless base station when the destination wireless base station determines based on the transfer order information that the transfer order of the transmission packet data is not correct.

* * * * *